US012771500B2

(12) United States Patent
He

(10) Patent No.: US 12,771,500 B2
(45) Date of Patent: Oct. 20, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 599 days.

(21) Appl. No.: 18/190,849

(22) Filed: Mar. 27, 2023

(65) Prior Publication Data

US 2023/0239097 A1 Jul. 27, 2023

Related U.S. Application Data

(63) Continuation of application No. PCT/CN2020/118943, filed on Sep. 29, 2020.

(51) Int. Cl.
*H04L 5/00* (2006.01)
*H04W 28/02* (2009.01)

(52) U.S. Cl.
CPC ....... *H04L 5/0048* (2013.01); *H04W 28/0215* (2013.01)

(58) Field of Classification Search
CPC ....... H04B 17/328; H04L 5/00; H04L 5/0048; H04W 8/22; H04W 24/08;
(Continued)

(56) References Cited

U.S. PATENT DOCUMENTS

2019/0174434 A1 6/2019 Koskinen et al.
2019/0281632 A1 9/2019 Sha et al.
(Continued)

FOREIGN PATENT DOCUMENTS

CN 108738141 A 11/2018
CN 109511156 A 3/2019
(Continued)

OTHER PUBLICATIONS

3GPP TS 38.133 V16.4.0 (Jun. 2020)—This Technical Specification has been produced by the 3rd Generation Partnership Project (3GPP) (290 pages).
(Continued)

*Primary Examiner* — Donald L Mills
(74) *Attorney, Agent, or Firm* — ASHURST PERKINS COIE US LLP

(57) ABSTRACT

A wireless communication method, a terminal device and a network device. The method comprises: according to a first reference signal measurement quantity threshold, a terminal device determining a target reference signal measurement quantity threshold used by the terminal device, wherein the first reference signal measurement quantity threshold is a reference signal measurement quantity threshold corresponding to a first-type terminal, the terminal device belongs to the first-type terminal, and the first-type terminal comprises a reduced capability terminal; or, according to a reference signal measurement quantity threshold corresponding to a second-type terminal and a capability of the first-type terminal, the terminal device determining a target reference signal measurement quantity threshold used by the terminal device, wherein the terminal device belongs to the first-type terminal, the first-type terminal comprises the reduced capability terminal, and the second-type terminal does not comprise the reduced capability terminal.

14 Claims, 3 Drawing Sheets

(58) Field of Classification Search
CPC ............. H04W 28/0215; H04W 48/12; H04W 72/231; H04W 72/51; H04W 72/542; H04W 74/004; H04W 88/02
See application file for complete search history.

(56) References Cited

U.S. PATENT DOCUMENTS

| | | | | |
|---|---|---|---|---|
| 2020/0015236 | A1 | 1/2020 | Kung et al. | |
| 2020/0029369 | A1 | 1/2020 | Huang et al. | |
| 2022/0159493 | A1* | 5/2022 | Geng | H04J 11/0073 |
| 2023/0164681 | A1* | 5/2023 | Chen | H04W 48/16<br>455/434 |
| 2023/0189235 | A1* | 6/2023 | Zheng | H04W 72/23<br>370/329 |
| 2023/0371082 | A1* | 11/2023 | Lei | H04W 80/02 |

FOREIGN PATENT DOCUMENTS

| | | | |
|---|---|---|---|
| CN | 109565670 | A | 4/2019 |
| CN | 110431857 | A | 11/2019 |
| CN | 110798871 | A | 2/2020 |
| CN | 111132314 | A | 5/2020 |
| WO | 2015116732 | A1 | 8/2015 |

OTHER PUBLICATIONS

3GPP TS 38.211 V16.2.0 (Jun. 2020)—3rd Generation Partnership Project; Technical Specification Group Radio Access Network; NR; Physical channels and modulation (Release 16) (126 pages).
3GPP TS 38.213 V16.2.0 (Jun. 2020)—3rd Generation Partnership Project; Technical Specification Group Radio Access Network; NR; Physical layer procedures for control (Release 16) (176 pages).
3GPP TS 38.321 V16.1.0 (Jul. 2020)—3rd Generation Partnership Project; Technical Specification Group Radio Access Network; NR; Medium Access Control (MAC) protocol specification (Release 16) (150 pages).
3GPP TS 38.331 V16.1.0 (Jul. 2020)—3rd Generation Partnership Project; Technical Specification Group Radio Access Network; NR; Radio Resource Control (RRC) protocol specification (Release 16) (902 pages).
3GPP TSG-RAN WG2 Meeting #98—R2-1706108—Hangzhou, China, May 15-19, 2017—Ericsson, Configuration of preamble groups for CE levels and preamble groups A/B—Alt2 (12 pages).
International Search Report with English translation of PCT/CN2020/118943 mailed Jun. 24, 2021 (4 pages).
Written Opinion with English translation of PCT/CN2020/118943 mailed Jun. 24, 2021 (9 pages).
First Office Action of the Chinese application No. 202310433895.7, issued on Jul. 27, 2024. 14 pages with English translation.
Decision of Rejection of the Chinese application No. 202310433895.7, issued on Mar. 12, 2025. 13 pages with English translation.
Search Report for European Application No. 20955558.0 issued Sep. 26, 2023. 10 pages.
Ericsson, "Lower power class UE for LTE-MTC " R2-1803066, 3GPP TSG-RAN WG2 #101 Athens, Greece, Feb. 26-Mar. 2, 2018. 7 pages.
First Examination Report for Indian Application No. 202327027404 issued Sep. 6, 2023. 6 pages.
Office Action dated Nov. 2, 2024 for Chinese Patent Application No. 202310433895.7, 15pages with English Translation.
Notice of Preliminary Rejection dated Sep. 25, 2025 for Korean Patent Application No. 10-2023-7013914 and English Translation, 13 pages.
ZTE, R1-2005474, Potential UE complexity reduction features, 3GPP TSG RAN WG1#102-e, e-Meeting, Aug. 17-28, 2020. 19 pages.
Hearing Notice dated Mar. 27, 2026 for Indian Patent Application No. 202327027404, 2 pages.

* cited by examiner

WIRELESS COMMUNICATION METHOD, TERMINAL DEVICE AND NETWORK DEVICE

CROSS-REFERENCE TO RELATED APPLICATION(S)

The present application is a continuation application of International PCT Application No. PCT/CN2020/118943, filed on Sep. 29, 2020, the entire content of which is hereby incorporated by reference.

TECHNICAL FIELD

Implementations of the present disclosure relate to the field of wireless communication, and more particularly, to a method for wireless communication, a terminal device, and a network device.

BACKGROUND

In a New Radio (NR) system, a network device sends random access related parameters to a terminal device through system information, wherein in a Random Access Channel-Configuration Common Information Element (RACH-ConfigCommon IE), a Reference Signal Receiving Power (RSRP) threshold (rsrp-ThresholdSSB) for a Synchronization Signal Block (SSB) is used for SSB selection by the terminal device. Specifically, the terminal device compares an RSRP measurement result for the SSB with the threshold, and selects an SSB whose measurement value is higher than the threshold for access.

In some scenarios, a Reduced Capability (RedCap) terminal is introduced for a scenario with low requirements on performance such as delay, reliability, bandwidth, coverage and throughput. A measurement result of the SSB by the RedCap terminal is quite different from a measurement result of the SSB by a non-RedCap terminal. In that case, an urgent problem to be solved for the RedCap terminal is to select a suitable SSB for subsequent random access.

SUMMARY

Implementations of the present disclosure provide a method for wireless communication, a terminal device and a network device, which are beneficial to ensuring that a reduced capability terminal selects a suitable downlink reference signal.

In a first aspect, a method for wireless communication is provided. The method includes: according to a first reference signal measurement quantity threshold, determining, by a terminal device, a target reference signal measurement quantity threshold used by the terminal device, wherein the first reference signal measurement quantity threshold is a reference signal measurement quantity threshold corresponding to a first type of terminal, the terminal device is the first type of terminal, and the first type of terminal includes a reduced capability terminal; or, according to a reference signal measurement quantity threshold corresponding to a second type of terminal and a capability of the first type of terminal, determining, by the terminal device, a target reference signal measurement quantity threshold used by the terminal device, wherein the terminal device is the first type of terminal, the first type of terminal includes the reduced capability terminal, and the second type of terminal does not include the reduced capability terminal.

In a second aspect, a method for wireless communication is provided. The method for wireless communication includes sending, by a network device, first configuration information used for configuring a first reference signal measurement threshold, wherein the first reference signal measurement threshold is a reference signal measurement threshold corresponding to a first type of terminal, the terminal device is the first type of terminal, and the first type of terminal includes a reduced capability terminal.

In a third aspect, a terminal device is provided, which is configured to perform the method in the above first aspect or any possible implementation mode of the first aspect. Specifically, the terminal device includes units for performing the method in the above first aspect or any possible implementation mode of the first aspect.

In a fourth aspect, a network device is provided, which is configured to perform the method in the above second aspect or any possible implementation mode of the second aspect. Specifically, the network device includes units for performing the method in the above second aspect or any possible implementation mode of the second aspect.

In a fifth aspect, a terminal device is provided, which includes: a processor and a memory. The memory is configured to store a computer program, and the processor is configured to call and run the computer program stored in the memory to perform the method in the first aspect or in various implementations thereof.

In a sixth aspect, a network device is provided, which includes: a processor and a memory. The memory is configured to store a computer program, and the processor is configured to call and run the computer program stored in the memory to perform the method in the second aspect or various implementations thereof.

In a seventh aspect, a chip is provided for implementing the method according to any one of the first and second aspects or any of various implementation modes thereof.

Specifically, the chip includes a processor configured to call and run a computer program from a memory to enable a device in which the chip is installed to perform the method according to any one of the first and second aspects or any of various implementation modes thereof.

In an eighth aspect, there is provided a computer readable storage medium configured to store a computer program, which causes a computer to perform the method according to any one of the above first and second aspects or various implementations thereof.

In a ninth aspect, a computer program product is provided, which includes computer program instructions, the computer instructions enable a computer to perform the method according to any one of the first and second aspects or any of various implementation modes thereof.

In a tenth aspect, a computer program is provided, when the computer program is run on a computer, the computer program enables the computer to perform the method in any one of the first and second aspects or various implementations thereof.

Based on the above technical solutions, the network device can configure a special reference signal measurement threshold for the first type of terminal, or the terminal device can determine the reference signal measurement threshold corresponding to the first type of terminal according to the reference signal measurement threshold corresponding to the second type of terminal in combination with the capability of the first type of terminal. Further, when the first type of terminal selects the reference signal based on the reference signal measurement threshold, it is beneficial to ensuring that a suitable reference signal is selected, thereby ensuring subsequent data communication.

DETAILED DESCRIPTION

Figure 1:
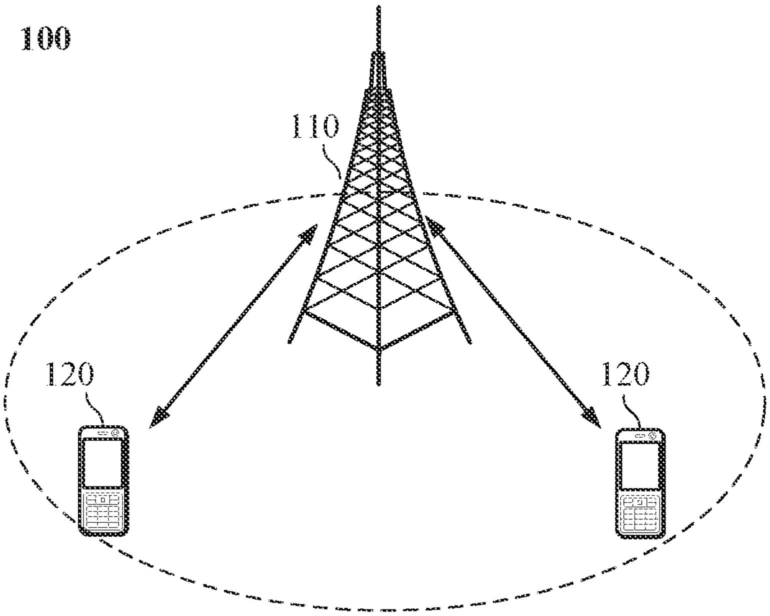
FIG. 1 is a schematic diagram of an application scenario according to an implementation of the present disclosure.

Technical solutions in the implementations of the present disclosure will be described below with reference to the accompanying drawings in the implementations of the present disclosure. It is apparent that the implementations described are just a part of the implementations of the present disclosure, rather than all of the implementations of the present disclosure. With regard to the implementations of the present disclosure, all other implementations obtained by a person of ordinary skill in the art without making an inventive effort are within the protection scope of the present disclosure.

Technical solutions according to implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunications System (UMTS), Wireless Local Area Networks (WLAN), Wireless Fidelity (WiFi), a 5th-generation (5G) communication system, or another communication system, etc.

Generally, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the implementations of the present disclosure may be applied to those communication systems as well.

Optionally, the communication systems in the implementations of the present disclosure can be applied to a carrier aggregation (CA) scenario, or a dual connectivity (DC) scenario, or a standalone (SA) networking scenario.

Optionally, the communication system in an implementation of the present disclosure may be applied to an unlicensed spectrum, wherein the unlicensed spectrum may also be considered as a shared spectrum; or, the communication system in an implementation of the present disclosure may also be applied to a licensed spectrum, wherein the licensed spectrum may also be considered as a non-shared spectrum.

Various implementations of the present disclosure are described in combination with the network device and the terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc.

The terminal device may be a station (ST) in a WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or other processing devices connected to a wireless modem, a vehicle-mounted device, a wearable device, a terminal device in a next generation communication system such as an NR network, or a terminal device in a future evolved Public Land Mobile Network (PLMN).

In an implementation of the present disclosure, a terminal device may be deployed on land including indoor or outdoor, handheld, wearable or vehicle-mounted terminal device; or it may be deployed on water (such as on ships, etc.); or it may be deployed aerially (such as in airplanes, balloons and satellites, etc.).

In an implementation of the present disclosure, the terminal device may be a mobile phone, a Pad, a computer with wireless transceiving function, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

As an example rather than limitation, in the implementations of the present disclosure, the terminal device may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices which are fully functional, have large sizes, and may implement complete or partial functions without relying on smart phones, such as a smart watch or smart glasses, and devices which focus on a certain kind of application functions only and need to be used in conjunction with other devices such as smart phones, such as various smart bracelets, smart jewelries or the like for monitoring physical signs.

In an implementation of the present disclosure, a network device may be a device used for communicating with a mobile device, and may be an Access Point (AP) in the WLAN, a Base Transceiver Station (BTS) in GSM or CDMA, a NodeB (NB) in WCDMA, an evolutional Node B (eNB or eNodeB) in LTE, a relay station or an access point, a vehicle-mounted device, a wearable device, a network device (gNB) in the NR network, a network device in a future evolved PLMN network, or a network device in an NTN network, etc.

As an example rather than limitation, in an implementation of present disclosure, a network device may be of mobility, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may be a base station disposed in a position on land or a water region etc.

In an implementation of the present disclosure, a network device may provide a service for a cell, and a terminal device communicates with the network device through a transmission resource (e.g., a frequency domain resource, which is also referred to as a spectrum resource) used by the cell, wherein the cell may be a cell corresponding to the network device (e.g., a base station), and the cell may belong to a macro base station, or may belong to a base station corresponding to a Small cell. The Small cell herein may include a Metro cell, a Micro cell, a Pico cell, or a Femto cell, etc. The Small cells are characterized by a small coverage range and a low transmission power, and are suitable for providing high-speed data transmission services.

Illustratively, a communication system 100 in which an implementation of the present disclosure is applied is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area.

FIG. 1 illustrates one network device and two terminal devices. Optionally, the communication system 100 may include multiple network devices, and other quantity of terminal devices may be included within the coverage area of each network device, which is not limited in the implementations of the present disclosure.

Optionally, the communication system 100 may also include another network entity, such as a network controller, a mobile management entity, etc., which is not limited in the implementations of the present disclosure.

It should be understood that a device with a communication function in a network/system in the implementations of the present disclosure may also be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. Communication devices may also include other devices in the communication system 100, for example, other network entities such as a network controller and a mobility management entity, which is not limited in the implementations of the present disclosure.

It should be understood that the terms "system" and "network" are often used interchangeably herein. The term "and/or" herein refers to an association relationship describing associated objects only, which indicates that there may be three kinds of relationships, for example, A and/or B may indicate three cases: A alone, both A and B, and B alone. In addition, the symbol "/" herein generally indicates that objects before and after the symbol "/" have an "or" relationship.

It should be understood that "indication" involved in implementations of the present disclosure may be a direct indication, may be an indirect indication, or may represent an association relationship. For example, that A indicates B may mean that A indicates B directly, for example, B can be acquired through A; or it may mean that A indicates B indirectly, for example, A indicates C, and B can be acquired through C; or it may mean that there is an association between A and B.

In the description of the implementations of the present disclosure, the term "correspond" may mean that there is a direct correspondence or an indirect correspondence between two parties, or mean that there is an association between two parties, or mean a relationship such as indicating and being indicated, configuring and being configured, etc.

In an implementation of the present disclosure, the term "predefining" may be achieved by pre-storing corresponding codes, tables or other ways that may be used to indicate relevant information in devices (e.g., including terminal devices and network devices), and the specific implementation thereof is not limited in the present disclosure. For example, the term "predefining" can refer to defining in a protocol.

In an implementation of the present disclosure, the term "protocol" may refer to a standard protocol in the communication field. For example, the protocol can include an LTE protocol, an NR protocol, and related protocols applied in future communication systems, which is not limited in the present disclosure.

In an NR system, two random access ways can be supported, i.e., contention based random access and non-contention based random access. Specifically, a terminal device can select Physical Random Access Channel (PRACH) resources, which can include time domain resources, frequency domain resources and code domain resources. A network device sends random access related parameters to a terminal device by broadcasting a System Information Block (SIB), wherein in a Random Access Channel-Configuration Common Information Element (RACH-ConfigCommon IE), a Reference Signal Receiving Power (RSRP) threshold (rsrp-ThresholdSSB) for a Synchronization Signal Block (SSB) is used for SSB selection by the terminal device. The terminal device compares an RSRP measurement result for each SSB with the threshold rsrp-ThresholdSSB, and selects an SSB whose measurement value is higher than a configured threshold for access.

In Release 17 (R17), a RedCap terminal (also known as a RedCap device) is introduced for a scenario with low performance requirements. The scenario may be, but not limited to, the following scenarios.

Scenario 1: it is for industrial wireless sensors, wherein the industrial wireless sensors have relatively low requirements on delay and reliability, compared with Ultra-Reliable and Low Latency Communication (URLLC) terminals. Moreover, device cost and power consumption of industrial wireless sensors are lower than those of URLLC terminals and Enhance Mobile Broadband (eMBB) terminals.

Scenario 2: it is for video surveillance, wherein a RedCap terminal can be used for video surveillance in scenarios such as smart city, and industrial process. In the smart city scenario, the RedCap device is mainly used for data collection and processing, so as to achieve more effective monitoring and control of city resources and provide more effective services for city residents.

Scenario 3: it is for wearables, wherein the wearables include, but are not limited to, smart watches, rings, electronic health devices, medical monitoring devices, etc. These devices are usually small in size.

Therefore, compared with other terminals, capabilities of RedCap terminals supporting the above-mentioned scenarios are reduced, such as a reduced supported bandwidth, a relaxed processing time, the reduced quantity of antennas. Due to reduced capabilities, e.g. the reduced quantity of receiving antennas or the decreased antenna gain, the RSRP measurement result for the SSB by the RedCap terminal is decreased compared with an RSRP measurement result for the SSB by a non-RedCap terminal. Therefore, if the RedCap terminal determines a selected SSB according to an RSRP threshold of the non-RedCap terminal, the RedCap terminal can not find an SSB meeting the RSRP threshold, thus failing in obtaining corresponding PRACH resources and affecting a subsequent random access process.

Figure 2:
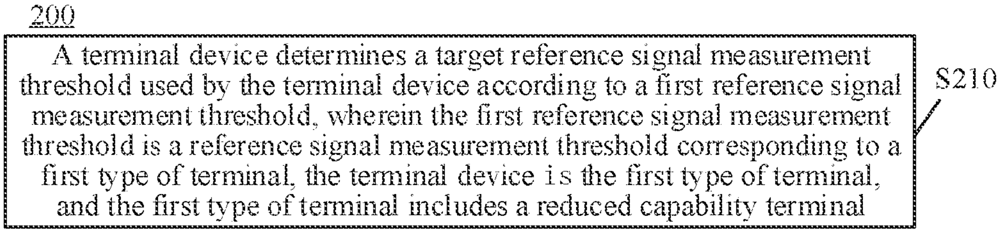
FIG. 2 is a schematic diagram of a method for wireless communication according to an implementation of the present disclosure.

FIG. 2 is a schematic flow chart of a method 200 for wireless communication according to an implementation of the present disclosure. The method 200 can be performed by the terminal device in the communication system shown in FIG. 1. As shown in FIG. 2, the method 200 may include at least part of the following content.

In S210, a terminal device determines a target reference signal measurement threshold used by the terminal device according to a first reference signal measurement threshold, wherein the first reference signal measurement threshold is a reference signal measurement threshold corresponding to a first type of terminal, the terminal device is the first type of terminal, and the first type of terminal includes a reduced capability terminal.

In some implementations, the target reference signal measurement threshold is the first reference signal measurement threshold.

Optionally, in an implementation of the present disclosure, at least two types of terminals may be included, such as the first type of terminal and the second type of terminal. In some implementations, the at least two types of terminals may be divided according to capabilities of terminal devices, or may also be divided according to differences in measurement results of the reference signal by the terminal device, which is not limited in the present disclosure.

Optionally, capabilities of terminal devices may include, for example, at least one of the quantity of the receiving antennas, a receiving antenna gain, and a coverage capability level. Optionally, other performance indices that can affect a reception capability (or reception performances that affect the measurement result of the reference signal) may also be included, which is not limited in the present disclosure.

Optionally, the coverage capability level can be expressed as a receiving capability level of the terminal device, which is proportional to the quantity of the receiving antennas and the receiving antenna gain of the terminal device. That is, the more the quantity of the receiving antennas, the higher the coverage capability level; and the greater the receiving antenna gain, the higher the coverage capability level.

In some implementations of the present disclosure, the network device can configure reference signal measurement thresholds corresponding to different types of terminals. For example, the first type of terminal is configured with a first reference signal measurement threshold, and the second type of terminal is configured with a second reference signal measurement threshold, so that different types of terminals can use corresponding reference signal measurement thresholds to select reference signals, which is beneficial to selecting a suitable reference signal.

It should be understood that the first type of terminal may be any type of terminal which needs to perform differentiated reference signal measurement configuration. For example, the capability of the first type of terminal differs from the capability of the second type of terminal, more specifically, the capability of the first type of terminal is lower than the capability of the second type of terminal; or, the capability of the first type of terminal is higher than the capability of the second type of terminal.

In some implementations, the first type of terminal includes a reduced capability terminal, i.e. a RedCap terminal. The second type of terminal includes an ordinary terminal, wherein the capability of the ordinary terminal is higher than the capability of the reduced capability terminal. In other words, the capability of the first type of terminal is lower than the capability of the second type of terminal.

In some other implementations, the first type of terminal includes an enhanced capability terminal. The second type of terminal includes an ordinary terminal. The capability of the ordinary terminal is lower than the capability of the enhanced capability terminal. In other words, the capability of the first type of terminal is higher than the capability of the second type of terminal.

In an implementation of the present disclosure, an independent reference signal measurement threshold is configured for a terminal with a large difference in the capability of the second type of terminal, so that this type of terminal can use a corresponding reference signal measurement threshold to select a reference signal, which is beneficial to selecting appropriate reference signals.

In some implementations, the reduced capability terminal may include a terminal in the above three scenarios, or the reduced capability terminal can include a terminal in a Machine Type of Communication (MTC), an evolved Machine Type of Communication (eMTC), or a Narrow Band Internet of Things (NB-IoT). Terminals in these technologies greatly reduce the hardware complexity, data throughput and processing speed of the terminals, so the terminals can also be referred to as reduced capability terminals, or the terminals can also include terminals applied to some smart homes, smart cities, intelligent plants, remote monitoring and smart transportation application scenarios with lower requirements, which is not limited in the present disclosure.

It should be understood that the reduced capability terminal in an implementation of the present disclosure may also be replaced by other expressions for indicating a class of terminals with lower requirements on performance such as delay, reliability, bandwidth, coverage, throughput, etc., or a class of terminals with lower capability, or a class of terminals with lower reference signal measurement results, etc., and it is the same with an enhanced capability terminal, which is not limited in the present disclosure.

Hereinafter, the first type of terminal acting as a reduced capability terminal and the second type of terminal acting as an ordinary terminal are taken as an example for explanation, which is not limited in the present disclosure.

In some implementations, if the first type of terminal is a reduced capability terminal and the second type of terminal is an ordinary terminal, a measurement result of a downlink reference channel measured by the ordinary terminal is generally higher than a measurement result of the downlink reference signal measured by the reduced capability terminal because the capability of the ordinary terminal is higher than the capability of the reduced capability terminal.

Therefore, in some implementations, a first reference signal measurement threshold corresponding to the first type of terminal may be configured to be less than a second reference signal measurement threshold corresponding to the second type of terminal, facilitating a reduced capability terminal to select an appropriate downlink reference signal.

In some implementations, the first reference signal measurement threshold may be configured through system information, such as a Random Access Channel-Configuration Common Information Element (RACH-ConfigCommon IE) that can be contained in the system information.

In other implementations, the first reference signal measurement threshold may also be configured by other signaling or message, such as Radio Resource Control (RRC) signaling or paging message configuration, etc.

In an implementation of the present disclosure, the first type of terminal is of a plurality of sub-terminal types. Further, the network device can configure a plurality of the first reference signal measurement thresholds, and each sub-terminal type in the plurality of sub-terminal types corresponds to one of the first reference signal measurement thresholds, respectively. Each sub-terminal type in the plurality of sub-terminal types corresponds to a specific capability, that is, a capability corresponding to each sub-terminal type can be different.

In other words, the network device can determine, respectively, corresponding reference signal measurement thresholds for different types of reduced capability terminals, so that different types of reduced capability terminals can determine the sub-terminal types of reduced capability terminals themselves according to their own capabilities, and further determine the reference signal measurement threshold corresponding to the sub-terminal type as the target reference signal measurement threshold.

In some implementations, the first reference signal measurement threshold may be used for selection of the downlink reference signal.

For example, the terminal device may determine a downlink reference signal satisfying the first reference signal measurement threshold as the target reference signal according to the measurement result of the downlink reference signal and the first reference signal measurement threshold.

Further, the Physical Random Access Channel (PRACH) resource is determined according to the target reference signal and a first association relationship, wherein, the first association relationship is an association relationship between the downlink reference signal and the PRACH resource.

Optionally, in an implementation of the present disclosure, the downlink reference signal includes, but is not limited to, at least one of a Synchronization Signal Block (SSB), a Channel State Information Reference Signal (CSI-RS), a Demodulation Reference Signal (DMRS), for example.

It should be noted that in an implementation of the present disclosure, SSB can also be referred to as an SS block, or a Synchronization Signal/Physical Broadcast Channel block (SS/PBCH block).

Optionally, the measurement result of the downlink reference signal may be, but is not limited to, at least one of a Reference Signal Receiving Power (RSRP), a Reference Signal Receiving Quality (RSRQ), a Signal to Interference plus Noise Ratio (SINR) and a Channel Quality Indicator (CQI), for example.

As an example, the first reference signal measurement threshold may be an RSRP threshold.

In some other implementations, the first reference signal measurement threshold may be used for selection of the random access type.

In some implementations, when the terminal device supports both a 4-step random access type and a 2-step random access type, the terminal device determines, according to the first reference signal measurement threshold, a random access type that is used to initiate the random access.

For example, when the measurement result of the downlink reference signal is greater than the first reference signal measurement threshold, the 2-step random access type can be selected.

Therefore, by configuring a suitable reference signal measurement threshold for the reduced capability terminal, the reduced capability terminal can select a suitable random access type based on the reference signal measurement threshold, which is beneficial to improving the probability of random access success.

In still other implementations, the first reference signal measurement threshold may be used for selecting a carrier used to initiate the random access. The first reference signal measurement threshold may also be referred to as a Supplementary Uplink (SUL) carrier selection threshold, that is, the first reference signal measurement threshold can be used by the terminal device to determine whether to initiate the random access on the SUL carrier.

For example, when the measurement result of the downlink reference signal is greater than the first reference signal measurement threshold, the terminal device can select the SUL carrier, otherwise select a Normal Uplink (NU) carrier.

Therefore, by configuring a suitable reference signal measurement threshold for the reduced capability terminal, the reduced capability terminal can select a suitable carrier to initiate the random access based on the reference signal measurement threshold, which is beneficial to improving the probability of random access success.

It should be understood that the application of the above reference signal measurement threshold is used as an example only, and the reference signal measurement threshold may also be applicable to other scenarios where subsequent operations are further performed based on the measurement result of the downlink reference signal by measuring the downlink reference signal, which is not limited in the present disclosure.

Figure 3:
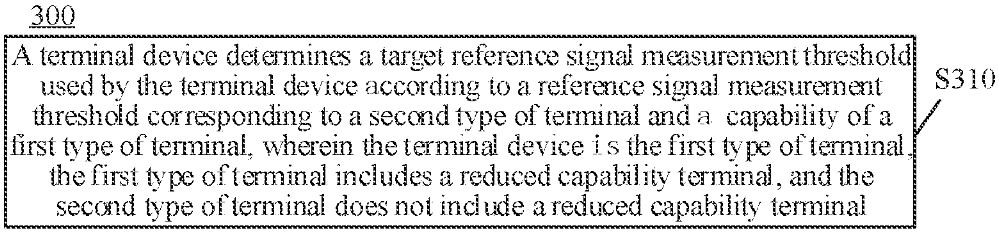
FIG. 3 is a schematic diagram of another method for wireless communication according to an implementation of the present disclosure.

FIG. 3 is a schematic flow chart of another method 300 for wireless communication according to an implementation of the present disclosure. The method 300 may be performed by a terminal device in the communication system shown in FIG. 1. As shown in FIG. 3, the method 300 may include at least part of the following act S310.

In S310, according to a reference signal measurement threshold corresponding to a second type of terminal and a capability of a first type of terminal, a terminal device determines a target reference signal measurement threshold used by the terminal device, wherein the terminal device is the first type of terminal, the first type of terminal includes a reduced capability terminal, and the second type of terminal does not include a reduced capability terminal.

It should be understood that in this implementation the meanings of the first type of terminal and the second type of terminal may be referred to the relevant description in method 200 and will not be repeated here.

In this implementation, the network device may not configure an independent reference signal measurement threshold for the first type of terminal, and the terminal device may determine a reference signal measurement threshold suitable for the first type of terminal according to the reference signal measurement threshold corresponding to the second type of terminal.

In other words, the network device can only configure the reference signal measurement threshold corresponding to the second type of terminal, and the reference signal measurement threshold corresponding to other types of terminals can be determined according to the reference signal measurement threshold corresponding to the second type of terminal.

In some implementations, the terminal device may determine the target reference signal measurement threshold used by the terminal device based on the reference signal measurement threshold corresponding to the second type of terminal in combination with the capability of the first type of terminal.

For example, if the capability of the first type of terminal is lower than that of the second type of terminal, the terminal device can determine that the reference signal measurement threshold corresponding to the first type of terminal is lower than the reference signal measurement threshold corresponding to the second type of terminal.

For example, the reference signal measurement threshold corresponding to the second type of terminal plus an offset is determined as the reference signal measurement threshold corresponding to the first type of terminal, wherein the offset is a negative number.

For another example, if the capability of the first type of terminal is higher than that of the second type of terminal, the terminal device can determine that the reference signal measurement threshold corresponding to the first type of terminal is higher than the reference signal measurement threshold corresponding to the second type of terminal.

For example, the reference signal measurement threshold corresponding to the second type of terminal plus an offset is determined as the reference signal measurement threshold corresponding to the first type of terminal, wherein the offset is a negative number.

In a specific implementation, the terminal device can determine a first adjustment amount according to the capability of the first type of terminal and the capability of the second type of terminal, and then determine the target reference signal measurement threshold according to the reference signal measurement threshold corresponding to the second type of terminal and the first adjustment amount.

In some implementations, the reference signal measurement threshold corresponding to the second type of terminal may be represented by an RSRP range (RSRP-Range). In some cases, the RSRP-Range ranges from 0 to 127, and an actual RSRP threshold is obtained by subtracting 156 dBm from a value in the RSRP-Range, except the case that the value is 127, at that point the actual RSRP threshold is infinity. The values in the RSRP-Range correspond to a range of measured RSRPs. Table 1 is an example of the RSRP-Range.

TABLE 1

| Reported value | Measurement quantity value (L3 SS-RSRP) | Measurement quality values (L1 SS-RSRP and CSI-RSRP) | Unit |
|---|---|---|---|
| RSRP_0 | SS-RSRP < −156 | Not valid | dBm |
| RSRP_1 | −156 ≤ SS-RSRP < −155 | Not valid | dBm |

TABLE 1-continued

| Reported value | Measurement quantity value (L3 SS-RSRP) | Measurement quality values (L1 SS-RSRP and CSI-RSRP) | Unit |
|---|---|---|---|
| RSRP_2 | −155 ≤ SS-RSRP < −154 | Not valid | dBm |
| RSRP_3 | −154 ≤ SS-RSRP < −153 | Not valid | dBm |
| RSRP_4 | −153 ≤ SS-RSRP < −152 | Not valid | dBm |
| RSRP_5 | −152 ≤ SS-RSRP < −151 | Not valid | dBm |
| RSRP_6 | −151 ≤ SS-RSRP < −150 | Not valid | dBm |
| RSRP_7 | −150 ≤ SS-RSRP < −149 | Not valid | dBm |
| RSRP_8 | −149 ≤ SS-RSRP < −148 | Not valid | dBm |
| RSRP_9 | −148 ≤ SS-RSRP < −147 | Not valid | dBm |
| RSRP_10 | −147 ≤ SS-RSRP < −146 | Not valid | dBm |
| RSRP_11 | −146 ≤ SS-RSRP < −145 | Not valid | dBm |
| RSRP_12 | −145 ≤ SS-RSRP < −144 | Not valid | dBm |
| RSRP_13 | −144 ≤ SS-RSRP < −143 | Not valid | dBm |
| RSRP_14 | −143 ≤ SS-RSRP < −142 | Not valid | dBm |
| RSRP_15 | −142 ≤ SS-RSRP < −141 | Not valid | dBm |
| RSRP_16 | −141 ≤ SS-RSRP < −140 | RSRP < −140 | dBm |
| RSRP_17 | −140 ≤ SS-RSRP < −139 | −140 ≤ RSRP < −139 | dBm |
| RSRP_18 | −139 ≤ SS-RSRP < −138 | −139 ≤ RSRP < −138 | dBm |
| . . . | . . . | | . . . |
| RSRP_111 | −46 ≤ SS-RSRP < −45 | −46 ≤ RSRP < −45 | dBm |
| RSRP_112 | −45 ≤ SS-RSRP < −44 | −45 ≤ RSRP < −44 | dBm |
| RSRP_113 | −44 ≤ SS-RSRP < −43 | −44 ≤ RSRP | dBm |
| RSRP_114 | −43 ≤ SS-RSRP < −42 | Not valid | dBm |
| RSRP_115 | −42 ≤ SS-RSRP < −41 | Not valid | dBm |
| RSRP_116 | −41 ≤ SS-RSRP < −40 | Not valid | dBm |
| RSRP_117 | −40 ≤ SS-RSRP < −39 | Not valid | dBm |
| RSRP_118 | −39 ≤ SS-RSRP < −38 | Not valid | dBm |
| RSRP_119 | −38 ≤ SS-RSRP < −37 | Not valid | dBm |
| RSRP_120 | −37 ≤ SS-RSRP < −36 | Not valid | dBm |
| RSRP_121 | −36 ≤ SS-RSRP < −35 | Not valid | dBm |
| RSRP_122 | −35 ≤ SS-RSRP < −34 | Not valid | dBm |
| RSRP_123 | −34 ≤ SS-RSRP < −33 | Not valid | dBm |
| RSRP_124 | −33 ≤ SS-RSRP < −32 | Not valid | dBm |
| RSRP_125 | −32 ≤ SS-RSRP < −31 | Not valid | dBm |
| RSRP_126 | −31 ≤ SS-RSRP | Not valid | dBm |
| RSRP_127 (Note) | Infinity | Infinity | dBm |

It should be noted that:
RSRP_127 is suitable for a configuration of the RSRP threshold in TS 38.331 [2], but not for measurement and reporting.

For example, if the second type of terminal supports a frequency band with the minimum quantity of the receiving antennas being 2 and the first type of terminal supports a frequency band with the quantity of the receiving antennas being 1, in that case, the first adjustment amount can be determined to be −3 dBm.

Then the second type of terminal obtains the actual RSRP threshold by subtracting 156 dBm from the value in the RSRP range in Table 1. The first type of terminal can obtain the actual RSRP threshold by subtracting 156 dBm and then subtracting 3 dBm from the value in the RSRP range in Table 1.

For example, if the network device indicates that the reference signal measurement threshold corresponding to the second type of terminal is 10, a calculated actual RSRP threshold for the second type of terminal is −146 dBm. The corresponding RSRP range in the above table is [−446, −145) dBm. For the second type of terminal, the calculated actual RSRP threshold is −149 dBm. The corresponding RSRP range in the above table is [−149, −148) dBm.

For example, if the second type of terminal supports a frequency band with the minimum quantity of the receiving antennas of 2, the first type of terminal supports a frequency band with the quantity of the receiving antennas of 1, the receiving antenna gain of the first type of terminal has a loss of 3 dB compared with the receiving antenna gain of the second type of terminal, the first adjustment amount can be determined to be −6 dBm.

Then the second type of terminal obtains the actual RSRP threshold by subtracting 156 dBm from the value in the RSRP range in Table 1. The first type of terminal can obtain the actual RSRP threshold by subtracting 156 dBm and then subtracting 6 dBm from the value in the RSRP range in Table 1.

For example, if the network device indicates that the reference signal measurement threshold corresponding to the second type of terminal is 10, a calculated actual RSRP threshold for the second type of terminal is −146 dBm. The corresponding RSRP range in the above table is [−146, −145) dBm. For the second type of terminal, the calculated actual RSRP threshold is −152 dBm. The corresponding RSRP range in the above table is [−152, −151) dBm.

It should be understood that the manner by which the first adjustment amount is determined is only used as an example and that in other implementations the first adjustment amount may also have other values, which is not limited in the present disclosure.

It should also be understood that in an implementation of the present disclosure, the manner by which the reference signal measurement threshold corresponding to the first type of terminal is determined based on the capabilities of the first type of terminal is only used as an example, and that in other implementations the terminal device can also determine its corresponding reference signal measurement threshold according to other algorithms, for example, there may be a specific offset between the reference signal measurement threshold corresponding to the first type of terminal and the reference signal measurement threshold corresponding to the second type of terminal, and the specific offset may be predefined, e.g. 3 dB, or may also be configured by the network device.

Therefore, in this implementation, it is unnecessary to add a new reference signal measurement threshold, and the terminal device determines, according to the preset algorithm, the target reference signal measurement threshold used by the terminal device itself according to the reference signal measurement threshold configured by the network device, which is beneficial to reducing signaling overhead, reducing modification to the existing protocol and maintaining backward compatibility.

In an implementation of the present disclosure, the first type of terminal is of a plurality of sub-terminal types, each of which corresponds to a specific capability, i.e. the capability of each sub-terminal type is also different.

Optionally, in some implementations, each sub-terminal type corresponds to a corresponding adjustment amount.

For example, the adjustment amount corresponding to the first sub-terminal type is −3 dB, and the adjustment amount corresponding to the second sub-terminal type is −6 dB, wherein the capability of the first sub-terminal type is higher than the capability of the second sub-terminal type.

Then a terminal device can determine the sub-terminal type of the terminal device according to the capability of the terminal device itself, and further determine the target adjustment amount in combination with the sub-terminal type of the terminal device.

In this implementation, the application of the reference signal measurement threshold corresponding to the first type of terminal determined by the terminal device may refer to the related implementation in the method 200, which is not repeated here for the sake of brevity.

In some implementations, the reference signal measurement threshold corresponding to the first type of terminal may be used for selection of the downlink reference signal.

In some other implementations, the reference signal measurement threshold corresponding to the first type of terminal may be used for selection of the random access type.

In still other implementations, the reference signal measurement threshold corresponding to the first type of terminal may be used to select a carrier used for initiating the random access.

Combining the foregoing implementations, the network device can configure a special reference signal measurement threshold for the first type of terminal, or the terminal device can determine the reference signal measurement threshold corresponding to the first type of terminal according to the reference signal measurement threshold corresponding to the second type of terminal in combination with a capability of the first type of terminal. Further, when the first type of terminal selects the reference signal based on the reference signal measurement threshold, it is beneficial to ensuring that a suitable reference signal is selected, thereby ensuring subsequent data communication.

The method for wireless communication according to the implementations of the present disclosure is described in detail above from a perspective of the terminal device in connection with FIGS. 2 and 3. Hereinafter, a method for wireless communication according to yet another implementation of the present disclosure will be described in detail from a perspective of the network device in connection with FIG. 4. It should be understood that the description of the network device side corresponds to the description of the terminal device side, and similar description may refer to the above description, which will not be repeated herein for brevity.

Figure 4:
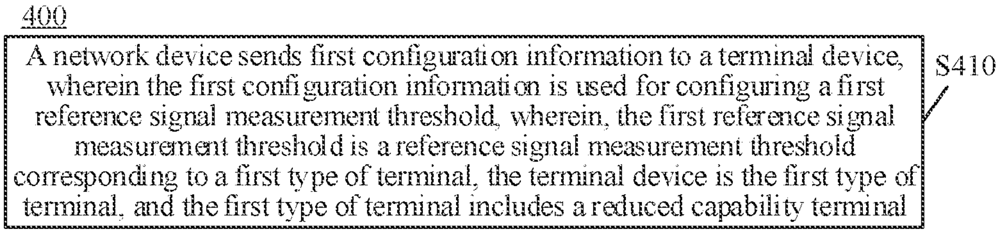
FIG. 4 is a schematic diagram of another method for wireless communication according to an implementation of the present disclosure.

FIG. 4 is a schematic flow chart of a method 400 for wireless communication according to yet another implementation of the present disclosure. The method 400 may be implemented by the network device in the communication system shown in FIG. 1. As shown in FIG. 4, the method 400 includes the following act S410.

In S410, a network device sends first configuration information to a terminal device, wherein the first configuration information is used for configuring a first reference signal measurement threshold, wherein, the first reference signal measurement threshold is a reference signal measurement threshold corresponding to a first type of terminal, the terminal device is the first type of terminal, and the first type of terminal includes a reduced capability terminal.

Optionally, in some implementations, a capability of the first type of terminal includes at least one of the quantity of the receiving antennas, a receiving antenna gain, a coverage capability level.

Optionally, in some implementations, the capability of the first type of terminal is different from the capability of the second type of terminal.

Optionally, in some implementations, that the capability of the first type of terminal is different from the capability of the second type of terminal includes at least one of following cases:

- the quantity of the receiving antennas of the first type of terminal is different from the quantity of the receiving antennas of the second type of terminal;
- the receiving antenna gain of the first type of terminal is different from the receiving antenna gain of the second type of terminal; and
- the coverage capability level of the first type of terminal is different from the coverage capability level of the second type of terminal.

Optionally, in some implementations, the second type of terminal corresponds to a second reference signal measurement threshold.

Optionally, in some implementations, the first reference signal measurement threshold is less than the second reference signal measurement threshold.

Optionally, in some implementations, the first type of terminal is of a plurality of sub-terminal types, and there are a plurality of the first reference signal measurement thresholds, and each sub-terminal type in the plurality of sub-terminal types corresponds to a first reference signal measurement threshold respectively, wherein, each sub-terminal type in the plurality of sub-terminal types corresponds to a specific capability.

Optionally, in some implementations, the first configuration information is contained in system information and/or a Radio Resource Control (RRC) signaling.

Optionally, in some implementations, the first reference signal measurement threshold includes a Reference Signal Received Power (RSRP) threshold.

Method implementations of the present disclosure are described in detail above in combination with FIGS. 2 to 4, and device implementations of the present disclosure will be described in detail below in combination with FIGS. 5 to 9. It should be understood that the device implementations correspond to the method implementations and can be described with reference to the method implementations.

Figure 5:
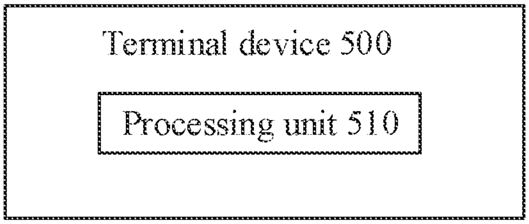
FIG. 5 is a schematic block diagram of a terminal device according to an implementation of the present disclosure.

FIG. 5 shows a schematic block diagram of a terminal device 500 in accordance with an implementation of the present disclosure. As shown in FIG. 5, a terminal device 500 includes a processing unit 510.

The processing unit 510 is configured to determine a target reference signal measurement quantity threshold used by the terminal device according to a first reference signal measurement quantity threshold, wherein the first reference signal measurement quantity threshold is a reference signal measurement quantity threshold corresponding to a first type of terminal, the terminal device is the first type of terminal, and the first type of terminal includes a reduced capability terminal; or, determine a target reference signal measurement quantity threshold used by the terminal device according to a reference signal measurement quantity threshold corresponding to a second type of terminal and a capability of the first type of terminal, wherein the terminal device is the first type of terminal, the first type of terminal includes the reduced capability terminal, and the second type of terminal does not include the reduced capability terminal.

Optionally, in some implementations, the capability of the first type of terminal includes at least one of a quantity of the receiving antennas, a receiving antenna gain, a coverage capability level.

Optionally, in some implementations, the capability of the first type of terminal is different from the capability of the second type of terminal.

Optionally, in some implementations, that the capability of the first type of terminal is different from the capability of the second type of terminal includes at least one of:

- the quantity of the receiving antennas of the first type of terminal is different from the quantity of the receiving antennas of the second type of terminal;
- the receiving antenna gain of the first type of terminal is different from the receiving antenna gain of the second type of terminal; and
- the coverage capability level of the first type of terminal differs from the coverage capability level of the second type of terminal.

Optionally, in some implementations, the second type of terminal corresponds to a second reference signal measurement threshold.

Optionally, in some implementations, the first reference signal measurement threshold is less than the second reference signal measurement threshold.

Optionally, in some implementations, the first type of terminal is of a plurality of sub-terminal types, and there are a plurality of the first reference signal measurement thresholds, and each sub-terminal type in the plurality of sub-terminal types corresponds to a first reference signal measurement threshold respectively, wherein, each sub-terminal type in the plurality of sub-terminal types corresponds to a specific capability.

Optionally, in some implementations, the first reference signal measurement threshold is configured by system information and/or a Radio Resource Control (RRC) signaling.

Optionally, in some implementations, the processing module 510 is further configured to:

- determine a first adjustment amount according to the capability of the first type of terminal; and
- determine the target reference signal measurement threshold according to the reference signal measurement threshold corresponding to the second type of terminal and the first adjustment amount.

Optionally, in some implementations, the first type of terminal is of a plurality of sub-terminal types, each of which corresponds to a particular capability, and the processing unit 510 is further configured to:

- determine a sub-terminal type of the terminal device among the plurality of sub-terminal types according to the capability of the terminal device; and
- determine the first adjustment amount according to the capability corresponding to the sub-terminal type of the terminal device.

Optionally, in some implementations, the processing module 510 is further configured to:

- determine a downlink reference signal satisfying the target reference signal measurement threshold as a target reference signal according to a measurement result of a downlink reference signal and the target reference signal measurement threshold.

Optionally, in some implementations, the processing module 510 is further configured to:

- determine a Physical Random Access Channel (PRACH) resource is according to the target reference signal and a first association relationship, wherein, the first association relationship is a correspondence relationship between the downlink reference signal and the PRACH resource.

Optionally, in some implementations, the processing module 510 is further configured to:

- determine the target random access type for random access according to the measurement result of the downlink reference signal and the target reference signal measurement threshold.

Optionally, in some implementations, the processing module 510 is further configured to:

- determine a target carrier used for initiating random access according to the measurement result of the downlink reference signal and the target reference signal measurement threshold.

Optionally, in some implementations, the downlink reference signal includes a Synchronization Signal Block (SSB).

Optionally, in some implementations, the first reference signal measurement threshold includes a Reference Signal Received Power (RSRP) threshold.

Optionally, in some implementations, the communication unit may be a communication interface or a transceiver, or an input/output interface of a communication chip or a system on a chip. The processing unit may be one or more processors.

It should be understood that the terminal device 500 according to the implementations of the present disclosure may correspond to the terminal device in the method implementations of the present disclosure, and the above-mentioned and other operations and/or functions of various units in the terminal device 500 are respectively for implementing the corresponding processes of the terminal device in the method implementation shown in FIG. 2 or 3, which will not be repeated here for brevity.

Figure 6:
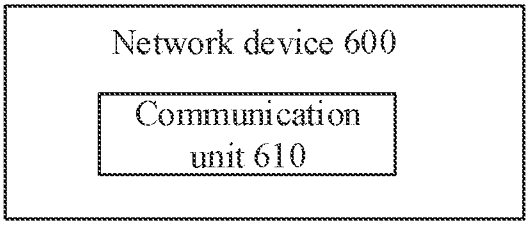
FIG. 6 is a schematic block diagram of a network device according to an implementation of the present disclosure.

FIG. 6 is a schematic block diagram of a network device according to an implementation of the present disclosure. The network device 600 in FIG. 6 includes a communication unit 610.

The communication unit 610 is configured to send first configuration information to a terminal device, wherein the first configuration information is used for configuring a first reference signal measurement threshold, wherein the first reference signal measurement threshold is a reference signal measurement threshold corresponding to a first type of terminal, the terminal device is the first type of terminal, and the first type of terminal includes a reduced capability terminal.

Optionally, in some implementations, a capability of the first type of terminal includes at least one of a quantity of the receiving antennas, a receiving antenna gain, and a coverage capability level.

Optionally, in some implementations, the capability of the first type of terminal is different from the capability of the second type of terminal.

Optionally, in some implementations, that the capability of the first type of terminal is different from the capability of the second type of terminal includes at least one of following cases:

- the quantity of the receiving antennas of the first type of terminal is different from the quantity of the receiving antennas of the second type of terminal;
- the receiving antenna gain of the first type of terminal is different from the receiving antenna gain of the second type of terminal; and
- the coverage capability level of the first type of terminal is different from the coverage capability level of the second type of terminal.

Optionally, in some implementations, the second type of terminal corresponds to a second reference signal measurement threshold.

Optionally, in some implementations, the first reference signal measurement threshold is less than the second reference signal measurement threshold.

Optionally, in some implementations, the first type of terminal is of a plurality of sub-terminal types, and there are a plurality of the first reference signal measurement thresholds, and each sub-terminal type in the plurality of sub-terminal types corresponds to a first reference signal measurement threshold respectively, wherein, each sub-terminal type in the plurality of sub-terminal types corresponds to a specific capability.

Optionally, in some implementations, the first configuration information is contained in system information and/or a Radio Resource Control (RRC) signaling.

Optionally, in some implementations, the first reference signal measurement threshold includes a Reference Signal Received Power (RSRP) threshold.

Optionally, in some implementations, the communication unit may be a communication interface or a transceiver, or an input/output interface of a communication chip or a system on a chip. The processing unit may be one or more processors.

It should be understood that the network device 600 in accordance with an implementation of the present disclosure may correspond to the network device in the method implementation of the present disclosure, and the above-mentioned and other operations and/or functions of various units in the network device 600 are respectively for implementing corresponding processes of the network device in the method 400 shown in FIG. 4, and will not be repeated herein for brevity.

Figure 7:
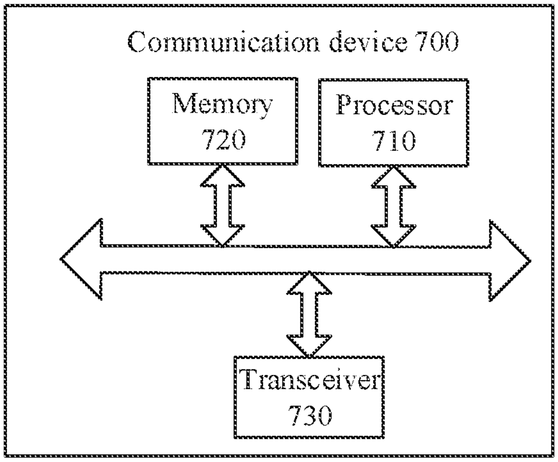
FIG. 7 is a schematic block diagram of a communication device according to another implementation of the present disclosure.

FIG. 7 is a schematic structure diagram of a communication device 700 in accordance with an implementation of the present disclosure. The communication device 700 shown in FIG. 7 includes a processor 710, wherein the processor 710 may invoke and run a computer program from a memory to implement the method in the implementations of the present disclosure.

Optionally, as shown in FIG. 7, the communication device 700 may further include a memory 720. The processor 710 may invoke and run a computer program from the memory 720 to implement the method in the implementations of the present disclosure.

The memory 720 may be a separate device independent of the processor 710, or may be integrated in the processor 710.

Optionally, as shown in FIG. 7, the communication device 700 may further include a transceiver 730, and the processor 710 may control the transceiver 730 to communicate with other devices. Specifically, the transceiver 1530 may send information or data to other devices or receive information or data sent by other devices.

The transceiver 730 may include a transmitter and a receiver. The transceiver 730 may further include antennas, a quantity of which may be one or more.

Optionally, the communication device 700 may specifically be the network device according to the implementations of the present disclosure, and the communication device 700 may implement corresponding processes implemented by the network device in various methods in the implementations of the present disclosure, which will not be repeated here for brevity.

Optionally, the communication device 700 may specifically be the mobile terminal/terminal device in accordance with an implementation of the present disclosure, and the communication device 700 may implement the corresponding processes implemented by the mobile terminal/terminal device in various methods in the implementations of the present disclosure, which will not be repeated herein for brevity.

Figure 8:
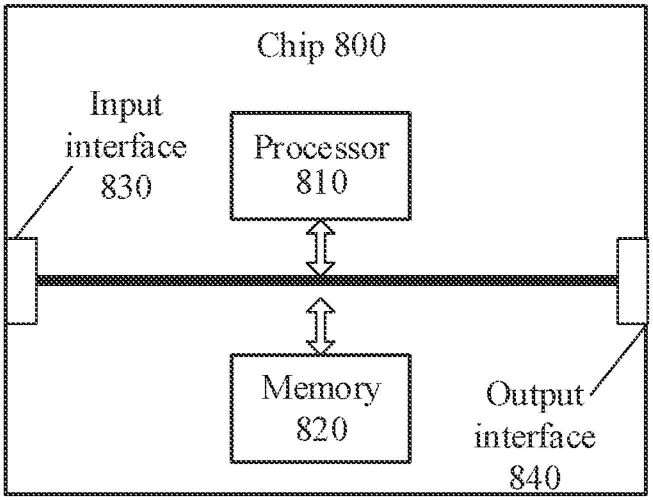
FIG. 8 is a schematic block diagram of a chip according to an implementation of the present disclosure.

FIG. 8 is a schematic diagram of a structure of a chip according to an implementation of the present disclosure. A chip 800 shown in FIG. 8 includes a processor 810 that may invoke a computer program from a memory and run the computer program to implement a method in an implementation of the present disclosure.

Optionally, as shown in FIG. 8, the chip 800 may further include a memory 820. The processor 810 may invoke and run a computer program from the memory 820 to implement the method in the implementations of the present disclosure.

Herein, the memory 820 may be a separate component independent of the processor 810, or may be integrated in the processor 810.

Optionally, the chip 800 may further include an input interface 830. The processor 810 may control the input interface 830 to communicate with another device or chip. Specifically, the processor 1610 may acquire information or data sent by another device or chip.

Optionally, the chip 800 may further include an output interface 840. The processor 810 may control the output interface 840 to communicate with another device or chip. Specifically, the processor 1610 may output information or data to another device or chip.

Optionally, the chip may be applied to the network device in the implementations of the present disclosure, and the chip may implement corresponding processes implemented by the network device in various methods of the implementations of the present disclosure, which will not be repeated here for brevity.

Optionally, the chip may be applied to the mobile terminal/terminal device in the implementations of the present disclosure, and the chip may implement corresponding processes implemented by the mobile terminal/terminal device in various methods of the implementations of the present disclosure, which will not be repeated herein for brevity.

It should be understood that the chip mentioned in the implementations of the present disclosure may also be referred to as a system-level chip, a system chip, a chip system, or a system on chip, etc.

Figure 9:
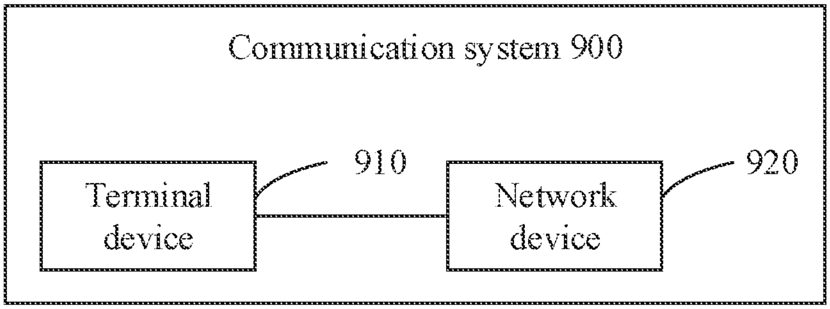
FIG. 9 is a schematic block diagram of a communication system according to an implementation of the present disclosure.

FIG. 9 is a schematic block diagram of a communication system 900 in accordance with an implementation of the present disclosure. As shown in FIG. 9, the communication system 900 includes a terminal device 910 and a network device 920.

The terminal device 910 may be configured to implement the corresponding functions implemented by the terminal device in the above-mentioned methods, and the network device 920 may be configured to implement the corresponding functions implemented by the network device in the above-mentioned methods, which will not be repeated herein for brevity.

It should be understood that the processor in the implementations of the present disclosure may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement various methods, acts, and logic block diagrams disclosed in the implementations of the present disclosure. The general purpose processor may be a microprocessor or the processor may be any conventional processor. The acts of the methods disclosed in connection with the implementations of the present disclosure may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and a processor reads information in the memory and completes the acts of the above methods in combination with its hardware.

It should be understood that the memory in the implementations of the present disclosure may be a transitory memory or a non-transitory memory, or may include both transitory and non-transitory memories. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that the above memories are described as examples rather than limitations. For example, the memory in the implementations of the present disclosure may be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct Rambus RAM (DR RAM), etc. That is to say, the memories in the implementations of the present disclosure are intended to include, but are not limited to, these and any other suitable types of memories.

An implementation of the present disclosure further provides a computer readable storage medium, configured to store a computer program.

Optionally, the computer readable storage medium may be applied to the network device in the implementations of the present disclosure, and the computer program causes a computer to perform the corresponding processes implemented by the network device in various methods in accordance with the implementations of the present disclosure, which will not be repeated herein for brevity.

Optionally, the computer readable storage medium may be applied to the mobile terminal/terminal device in the implementations of the present disclosure, and the computer program causes a computer to perform the corresponding processes implemented by the mobile terminal/terminal device in various methods in accordance with the implementations of the present disclosure, which will not be repeated herein for brevity.

An implementation of the present disclosure further provides a computer program product, including computer program instructions.

Optionally, the computer program product may be applied to the network device in the implementations of the present disclosure, and the computer program instructions cause a computer to perform the corresponding processes implemented by the network device in various methods in accordance with the implementations of the present disclosure, which will not be repeated herein for brevity.

Optionally, the computer program product may be applied to the mobile terminal/terminal device in the implementations of the present disclosure, and the computer program instructions cause a computer to perform the corresponding processes implemented by the mobile terminal/terminal device in various methods in accordance with the implementations of the present disclosure, which will not be repeated herein for brevity.

An implementation of the present disclosure further provides a computer program.

Optionally, the computer program may be applied to the network device in the implementations of the present disclosure. When the computer program is run on a computer, the computer is enabled to perform corresponding processes implemented by the network device in various methods according to the implementations of the present disclosure, which will not be repeated here for brevity.

Optionally, the computer program may be applied to the mobile terminal/terminal device in the implementations of the present disclosure. The computer program, when running on a computer, causes the computer to perform the corresponding processes implemented by the mobile terminal/terminal device in various methods in accordance with the implementations of the present disclosure, which will not be repeated herein for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present disclosure.

Those skilled in the art may clearly understand that for convenience and conciseness of description, specific working processes of the systems, apparatuses, and units described above may refer to corresponding processes in the aforementioned method implementations, and details will not be repeated here.

In several implementations according to the present disclosure, it should be understood that the disclosed systems, apparatuses, and methods may be implemented in other ways. For example, the apparatus implementations described above are only illustrative, for example, the division of the units is only a logical function division, and there may be other division manners in actual implementation. For example, multiple units or components may be combined or integrated into another system, or some features may be ignored or not executed. In addition, coupling or direct coupling or communication connection shown or discussed between each other, which may be indirect coupling or communication connection between the devices or units via some interfaces, may be electrical, mechanical, or in other forms.

The units described as separate components may be or may be not physically separated, and the component shown as a unit may be or may be not a physical unit, i.e., it may be located in one place or may be distributed on multiple network units. Part or all of units may be selected according to actual needs to achieve purposes of technical solutions of the implementations.

In addition, various functional units in various implementations of the present disclosure may be integrated in one processing unit, or various units may be physically present separately, or two or more units may be integrated in one unit.

The functions, if implemented in a form of software functional units and sold or used as an independent product, may be stored in a computer readable storage medium. Based on such understanding, the technical solutions of the present disclosure, in essence, or parts of them which contribute to the prior art, or parts of the technical solutions, may be embodied in a form of a software product, which is stored in a storage medium, and includes several instructions for enabling a computer device (which may be a personal computer, a server, or a network device, etc.) to perform all or part of the acts of the methods of various implementations of the present disclosure. The aforementioned storage medium includes various media capable of storing program codes, such as a U disk, a mobile hard disk, a read-only memory (ROM), a random access memory (RAM), a magnetic disk, or an optical disk, etc.

The foregoing are merely specific implementations of the present disclosure, but the protection scope of the present disclosure is not limited thereto. Any person skilled in the art may readily conceive variations or substitutions within the technical scope disclosed by the present disclosure, which should be included within the protection scope of the present disclosure. Therefore, the protection scope of the present disclosure shall be subject to the protection scope of the claims.

The invention claimed is:

1. A method for wireless communication, comprising:

determining, by a terminal device, a target reference signal measurement threshold of the terminal device according to a reference signal measurement threshold corresponding to a second type of terminal and a capability of a first type of terminal, wherein the terminal device is the first type of terminal, the first type of terminal comprises a reduced capability terminal, and the second type of terminal does not comprise a reduced capability terminal;

wherein the capability of the first type of terminal comprises a quantity of receiving antennas; the capability of the first type of terminal is different from a capability of the second type of terminal, that the capability of the first type of terminal is different from the capability of the second type of terminal comprises: the quantity of the receiving antennas of the first type of terminal is different from a quantity of receiving antennas of the second type of terminal;

wherein determining, by the terminal device, the target reference signal measurement threshold of the terminal device according to the reference signal measurement threshold corresponding to the second type of terminal and the capability of the first type of terminal, comprises:

determining a first adjustment amount according to the capability of the first type of terminal; and determining the target reference signal measurement threshold according to the reference signal measurement threshold corresponding to the second type of terminal and the first adjustment amount.

2. The method of claim 1, wherein the capability of the first type of terminal further comprises a coverage capability level.

3. The method of claim 1, wherein that the capability of the first type of terminal is different from the capability of the second type of terminal further comprises: the coverage capability level of the first type of terminal is different from a coverage capability level of the second type of terminal.

4. The method of claim 1, wherein the target reference signal measurement threshold is less than the reference signal measurement threshold corresponding to the second type of terminal.

5. The method of claim 1, further comprising:
determining a downlink reference signal satisfying the target reference signal measurement threshold as a target reference signal according to a measurement result of a downlink reference signal and the target reference signal measurement threshold, and
determining a Physical Random Access Channel (PRACH) resource according to the target reference signal and a first association relationship, wherein, the first association relationship is a correspondence relationship between the downlink reference signal and the PRACH resource.

6. The method of claim 1, further comprising:
determining a target random access type for random access according to a measurement result of a downlink reference signal and the target reference signal measurement threshold,
and
determining a target carrier used for initiating random access according to a measurement result of a downlink reference signal and the target reference signal measurement threshold.

7. The method of claim 6, wherein the downlink reference signal is a Synchronization Signal Block (SSB).

8. The method of claim 5, wherein the downlink reference signal is a Synchronization Signal Block (SSB).

9. A method for wireless communication comprising:
configuring, by a network device, a reference signal measurement threshold corresponding to a second type of terminal to a terminal device, wherein the terminal device is a first type of terminal, the first type of terminal comprises a reduced capability terminal, and the second type of terminal does not comprise a reduced capability terminal;
wherein a target reference signal measurement threshold of the terminal device is determined according to the reference signal measurement threshold corresponding to the second type of terminal and a capability of the first type of terminal;
the capability of the first type of terminal comprises a quantity of receiving antennas; the capability of the first type of terminal is different from a capability of the second type of terminal,
that the capability of the first type of terminal is different from the capability of the second type of terminal comprises: the quantity of the receiving antennas of the first type of terminal is different from a quantity of receiving antennas of the second type of terminal;
wherein that the target reference signal measurement threshold of the terminal device is determined according to the reference signal measurement threshold corresponding to the second type of terminal and the capability of the first type of terminal comprises:
a first adjustment amount is determined according to the capability of the first type of terminal, and the target reference signal measurement threshold of the terminal device is determined according to the reference signal measurement threshold corresponding to the second type of terminal and the first adjustment amount.

10. The method of claim 9, wherein the capability of the first type of terminal further comprises a coverage capability level,
wherein that the capability of the first type of terminal is different from the capability of the second type of terminal further comprises:
the coverage capability level of the first type of terminal is different from a coverage capability level of the second type of terminal.

11. The method of claim 9, wherein
the target reference signal measurement threshold is less than the reference signal measurement threshold corresponding to the second type of terminal.

12. A network device comprising: a processor and a transceiver, configured to perform the method of claim 9.

13. A terminal device comprising: a processor and a transceiver, wherein
the processor is configured to determine a first adjustment amount according to a capability of a first type of terminal, and determine a target reference signal measurement threshold of the terminal device according to a reference signal measurement threshold corresponding to a second type of terminal and the first adjustment amount, wherein the terminal device is the first type of terminal, the first type of terminal comprises a reduced capability terminal, and the second type of terminal does not comprise a reduced capability terminal;
wherein the capability of the first type of terminal comprises a quantity of receiving antennas; the capability of the first type of terminal is different from a capability of the second type of terminal,
that the capability of the first type of terminal is different from the capability of the second type of terminal comprises: the quantity of the receiving antennas of the first type of terminal is different from a quantity of receiving antennas of the second type of terminal.

14. The terminal device of claim 13, wherein the capability of the first type of terminal further comprises a coverage capability level,
that the capability of the first type of terminal is different from the capability of the second type of terminal further comprises:
the coverage capability level of the first type of terminal is different from a coverage capability level of the second type of terminal.

* * * * *